US012586392B2

(12) United States Patent
Yoon et al.

(10) Patent No.: US 12,586,392 B2
(45) Date of Patent: Mar. 24, 2026

(54) PERTURBATION ROBUST METRIC FOR EVALUATING IMAGE CAPTIONS

(71) Applicant: Adobe Inc., San Jose, CA (US)

(72) Inventors: Seunghyun Yoon, San Jose, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 468 days.

(21) Appl. No.: 18/179,177

(22) Filed: Mar. 6, 2023

(65) Prior Publication Data

US 2024/0304009 A1 Sep. 12, 2024

(51) Int. Cl.
*G06V 20/70* (2022.01)
*G06F 40/58* (2020.01)
*G06T 1/00* (2006.01)

(52) U.S. Cl.
CPC .............. *G06V 20/70* (2022.01); *G06F 40/58* (2020.01); *G06T 1/0021* (2013.01)

(58) Field of Classification Search
None
See application file for complete search history.

(56) References Cited

U.S. PATENT DOCUMENTS

2022/0058390 A1* 2/2022 Tran ........................ G06V 10/82

OTHER PUBLICATIONS

Anderson et al., "SPICE: Semantic Propositional Image Caption Evaluation", Jul. 29, 2016, pp. 1-17.
Banerjee et al., "METEOR: An Automatic Metric for MT Evaluation with Improved Correlation with Human Judgments", Proceedings of the ACL Workshop on Intrinsic and Extrinsic Evaluation Measures for Machine Translation and/or Summarization, Jun. 2005, pp. 65-72.
Chen et al., "UNITER: UNiversal Image-TExt Representation Learning", Jul. 17, 2020, pp. 1-26.
Chin-Yew Lin, "Rouge: A Package for Automatic Evaluation of Summaries", 2004, 8 pages.
Devlin et al., "BERT: Pre-training of Deep Bidirectional Transformers for Language Understanding", May 24, 2019, 16 pages.
(Continued)

*Primary Examiner* — Lennin R Rodriguezgonzalez
(74) *Attorney, Agent, or Firm* — Nicholson De Vos Webster & Elliott LLP

(57) ABSTRACT

Embodiments are disclosed for training an image caption evaluation system to perform evaluations of image captions. In particular, in one or more embodiments, the disclosed systems and methods comprise receiving a training image, a ground truth image caption for the training image, and a perturbed image caption for the training image, where the perturbed image caption includes modifications to the ground truth image caption. The disclosed systems and methods further comprise generating, by a visual encoder, a visual embedding representation of the training image and generating, by a perturbation-aware text encoder, a first text embedding for the ground truth image caption and a second text embedding for the perturbed image caption. The disclosed systems and methods further comprise computing losses between the visual embedding, the first text embedding, and the second text embedding and training the perturbation-aware text encoder based on the computed losses.

20 Claims, 8 Drawing Sheets

(56)     References Cited

OTHER PUBLICATIONS

Github, "Multilingual-CLIP", available online at <https://github.com/FreddeFrallan/Multilingual-CLIP>, Oct. 11, 2024, 5 pages.

Hessel et al., CLIPScore: A Reference-free Evaluation Metric for Image Captioning, Mar. 23, 2022, 15 pages.

Kusner et al., "From Word Embeddings to Document Distances", 2015, 10 pages.

Lee et al., "UMIC: An Unreferenced Metric for Image Captioning via Contrastive Learning", Jun. 26, 2021, 8 pages.

Lee et al., "VILBERTScore: Evaluating Image Caption Using Vision-and-Language BERT", Proceedings of the First Workshop on Evaluation and Comparison of NLP Systems (Eval4NLP), Nov. 20, 2020, pp. 34-39.

Madhyastha et al., "VIFIDEL: Evaluating the Visual Fidelity of Image Descriptions", Jul. 22 2019, 12 pages.

Papineni et al., "BLEU: a Method for Automatic Evaluation of Machine Translation", Proceedings of the 40th Annual Meeting of the Association for Computational Linguistics, Jul. 2002, pp. 311-318.

Radford et al., "Learning Transferable Visual Models From Natural Language Supervision", Feb. 26, 2021, 48 pages.

Sai et al., "Perturbation CheckLists for Evaluating NLG Evaluation Metrics", Proceedings of the 2021 Conference on Empirical Methods in Natural Language Processing, Nov. 7-11, 2021, pp. 7219-7234.

Vedantam et al., "CIDEr: Consensus-based Image Description Evaluation", Jun. 3, 2015, pp. 1-17.

Yi et al., "Improving Image Captioning Evaluation by Considering Inter References Variance", Proceedings of the 58th Annual Meeting of the Association for Computational Linguistics, Jul. 5-10, 2020, pp. 985-994.

Zhang et al., "BERTScore: Evaluating Text Generation With BERT", ICLR, Feb. 24, 2020, pp. 1-43.

* cited by examiner

IMAGE CAPTION EVALUATION SYSTEM 400

DISPLAY MANAGER 402

INPUT ANALYZER 404

VISUAL ENCODER 406

PERTURBATION-AWARE TEXT ENCODER 408

CAPTION SCORING MODULE 410

LOSS FUNCTIONS 416

TRAINING SYSTEM 412

INPUT DATA 418

TRAINING DATA 420

STORAGE MANAGER 414

500

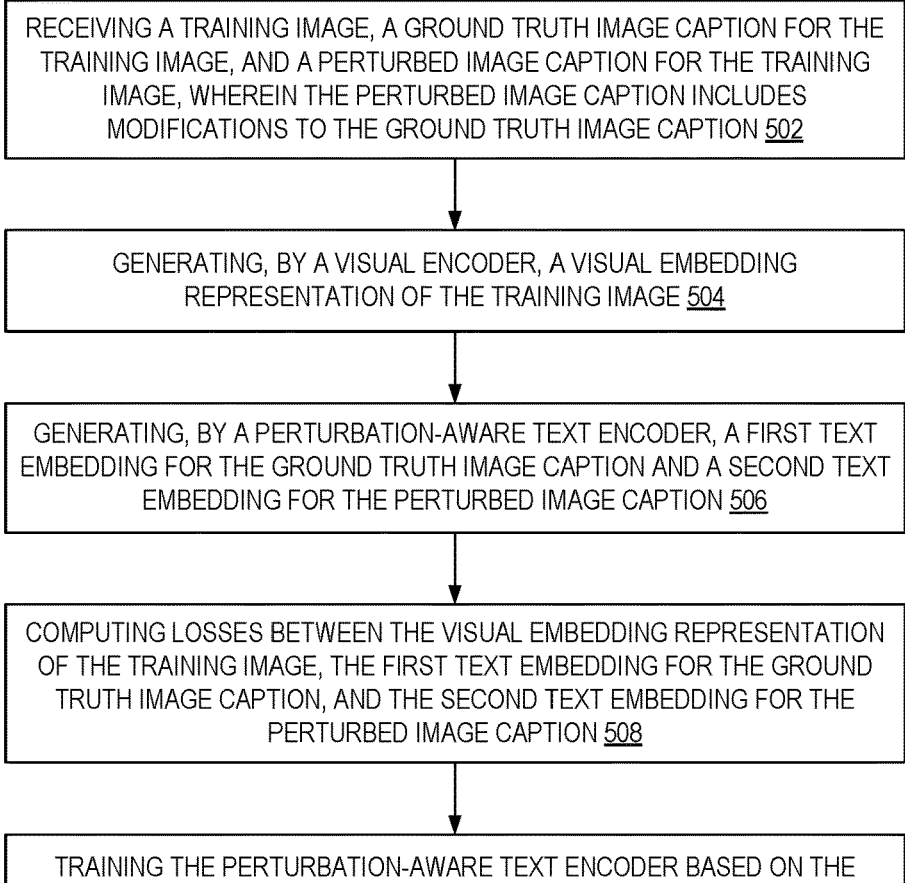

RECEIVING A TRAINING IMAGE, A GROUND TRUTH IMAGE CAPTION FOR THE TRAINING IMAGE, AND A PERTURBED IMAGE CAPTION FOR THE TRAINING IMAGE, WHEREIN THE PERTURBED IMAGE CAPTION INCLUDES MODIFICATIONS TO THE GROUND TRUTH IMAGE CAPTION 502

GENERATING, BY A VISUAL ENCODER, A VISUAL EMBEDDING REPRESENTATION OF THE TRAINING IMAGE 504

GENERATING, BY A PERTURBATION-AWARE TEXT ENCODER, A FIRST TEXT EMBEDDING FOR THE GROUND TRUTH IMAGE CAPTION AND A SECOND TEXT EMBEDDING FOR THE PERTURBED IMAGE CAPTION 506

COMPUTING LOSSES BETWEEN THE VISUAL EMBEDDING REPRESENTATION OF THE TRAINING IMAGE, THE FIRST TEXT EMBEDDING FOR THE GROUND TRUTH IMAGE CAPTION, AND THE SECOND TEXT EMBEDDING FOR THE PERTURBED IMAGE CAPTION 508

TRAINING THE PERTURBATION-AWARE TEXT ENCODER BASED ON THE COMPUTED LOSSES 510

*FIG. 5*

600

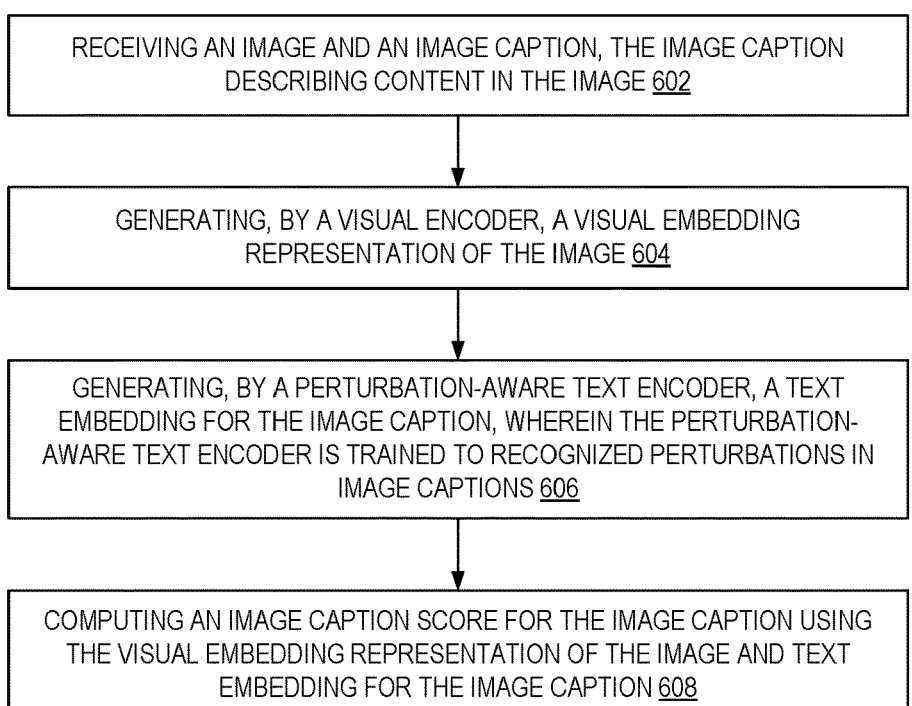

RECEIVING AN IMAGE AND AN IMAGE CAPTION, THE IMAGE CAPTION DESCRIBING CONTENT IN THE IMAGE 602

GENERATING, BY A VISUAL ENCODER, A VISUAL EMBEDDING REPRESENTATION OF THE IMAGE 604

GENERATING, BY A PERTURBATION-AWARE TEXT ENCODER, A TEXT EMBEDDING FOR THE IMAGE CAPTION, WHEREIN THE PERTURBATION-AWARE TEXT ENCODER IS TRAINED TO RECOGNIZED PERTURBATIONS IN IMAGE CAPTIONS 606

COMPUTING AN IMAGE CAPTION SCORE FOR THE IMAGE CAPTION USING THE VISUAL EMBEDDING REPRESENTATION OF THE IMAGE AND TEXT EMBEDDING FOR THE IMAGE CAPTION 608

SERVICE PROVIDER  702

SERVER(S) 704

NETWORK(S)
708

CLIENT DEVICE(S)
706B

CLIENT DEVICE(S)
706N

CLIENT DEVICE(S)
706A

PERTURBATION ROBUST METRIC FOR EVALUATING IMAGE CAPTIONS

BACKGROUND

Automatic image captioning is the process of generating a textual description of an image based on its content and is an important aspect in semantic scene understanding. This process can be performed using machine learning models trained to identify the subject, location, etc. of images. Automatic image captioning can provide numerous benefits, including for annotating images, assisting visually impaired people to understand the content of images, and visual question-answering purposes.

SUMMARY

Introduced here are techniques/technologies that allow for training a text encoder of an image caption evaluation system to distinguish between the original text of a ground truth caption and a modified version of the ground truth caption containing perturbed text. The text encoder of the image caption evaluation system can be further trained to handle image captions in multiple languages through a pre-training process.

In particular, in one or more embodiments, as part of a training process, an image caption evaluation system receives an input that includes an image, a ground truth image caption and a perturbed image caption. The perturbed image caption is a modified version of the ground truth image caption (e.g., words removed, masked, repeated, randomly shuffled, swapped within sentence, or replaced with words from another sentence). The image caption evaluation system uses a visual encoder, or image encoder, to generate a visual embedding representing the image. The image caption evaluation system uses a text encoder to generate a ground truth text embedding representing the ground truth image caption and a perturbed text embedding representing the perturbed image caption. The image caption evaluation system uses the embeddings to compute losses that, once backpropagated to the text encoder, train the text encoder to produce a higher evaluation score for the ground truth image caption by increasing the cosine similarity of the visual embedding and the ground truth text embedding, while decreasing the cosine similarity between perturbed text embedding with both the visual embedding and the ground truth text embedding. The image caption evaluation system can be further trained through an initial training phase to handle image captions in multiple languages.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 5 illustrates a flowchart of a series of acts in a method of training an image caption evaluation system to recognize perturbed image captions from ground truth image captions in accordance with one or more embodiments;

FIG. 6 illustrates a flowchart of a series of acts in a method of evaluating image captions generated for images using an image caption evaluation system trained to recognize perturbed image captions from ground truth image captions in accordance with one or more embodiments;

DETAILED DESCRIPTION

One or more embodiments of the present disclosure include an image caption evaluation system that trains a text encoder to recognize perturbations in image captions when computing evaluation metrics for image captions. The ability to evaluate the output of automatic image captioning system is important to ensure that these systems are accurately understanding the content of images and producing reliable image captions.

Some existing image caption evaluation solutions are reference-based metrics that evaluate image captions based on n-gram similarity with reference caption or by comparing contextualized embeddings of generated captions for evaluation and a reference caption. However, these solutions that require the additional step of a user-created or user-approved reference caption that is used for comparison with the image caption being evaluated.

Other existing solutions evaluate generated captions with images without the user of reference captions by directly evaluating generated caption from the vision-and-language embedding spaces. However, these existing systems are unreliable because they fail at capturing lexical noise in the generated captions. For example, when a generated caption is corrupted, or perturbed, the differences between the original image caption and the image caption with perturbations applied are not recognized. Because of this failure to recognize the changes, these systems output similar evaluation scores for the original and corrupted image caption, even when the changes cause the corrupted image caption to have a different meaning from the original image caption.

Existing image caption evaluation solutions have limitations and drawbacks, as some require labeled data (e.g., user-provided reference captions), while providing inadequate or unreliable results. To address these and other issues, embodiments train a text encoder with the perturbed captions in the way that the text encoder can distinguish the perturbed text embeddings from the original text embeddings. By using images and their corresponding ground truth captions to create the perturbed captions (e.g., by removing, masking, randomly shuffling, and swapping text elements in a ground truth caption), embodiments can train the text encoder to capture lexical perturbations without requiring labeled data or the engagement of linguistic experts.

Figure 1:
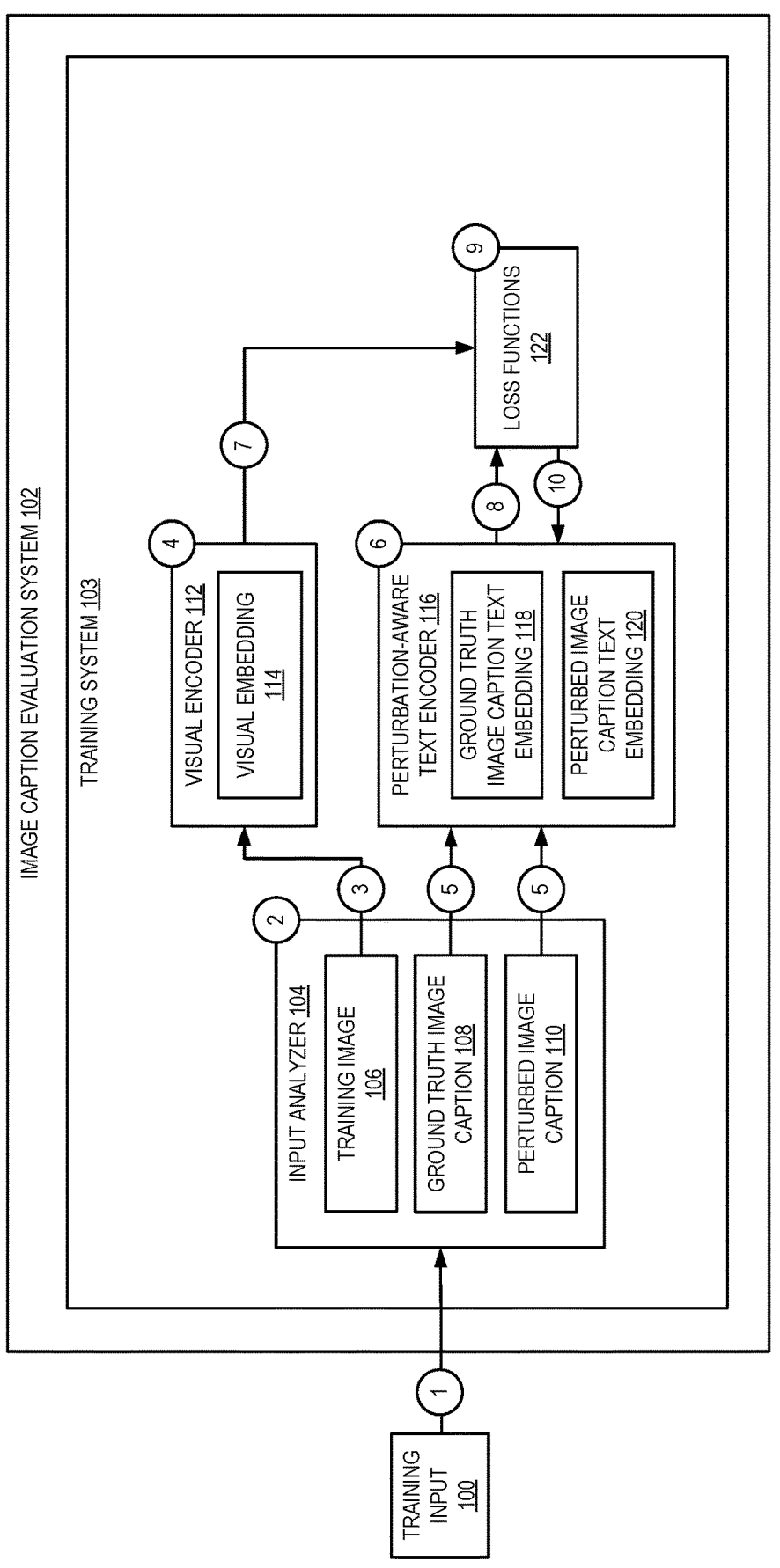
FIG. 1 illustrates a diagram of a process of training machine learning models to recognize ground truth image captions from perturbed image captions in accordance with one or more embodiments.

FIG. 1 illustrates a diagram of a process of training machine learning models to recognize ground truth image captions from perturbed image captions in accordance with one or more embodiments. In one or more embodiments, a training system 103 is configured to train a neural network to recognize ground truth image captions from perturbed image captions containing lexical perturbations (e.g., containing swapped, removed, masked, scrambled words or phrases that change the meaning of the caption) based on training inputs. In some embodiments, the training system 103 is a part of an image caption evaluation system 102. In other embodiments, the training system 103 can be a standalone system, or part of another system, and deployed to the image caption evaluation system 102. For example, the training system 103 may be implemented as a separate system implemented on electronic devices separate from the electronic devices implementing image caption evaluation system 102. By training a perturbation-aware text encoder 116 to recognize the difference between ground truth image captions and perturbed image captions, the image caption evaluation system 102 can produce image caption scores that are more accurate. As shown in FIG. 1, the training system 103 receives a training input 100, as shown at numeral 1. For example, the image caption evaluation system 102 receives the training input 100 from a user via a computing device or from a memory or storage location. In one or more embodiments, the training input 100 includes at least a training image (e.g., training image 106), a ground truth image caption (e.g., ground truth image caption 108), and a perturbed image caption (e.g., perturbed image caption 110). The training input 100 can include multiple training images and image captions that can be fed to the training system 103 in parallel or in series.

The image caption evaluation system 102 is a neural network trained on training triplets that include an image, a ground truth image caption for the image, and a perturbed version of the ground truth image caption. Through training, the image caption evaluation system 102 learns to recognize the difference between a ground truth image caption for the image and a perturbed version of the ground truth image caption to produce a more accurate and reliable evaluation system for scoring image captions. In one or more embodiments, a neural network includes deep learning architecture for learning representations of images, texts, audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As illustrated in FIG. 1, the image caption evaluation system 102 includes an input analyzer 104 that receives the training input 100. In some embodiments, the input analyzer 104 analyzes the training input 100, as shown at numeral 2. In some embodiments, the input analyzer 104 analyzes the training input 100 to identify the training image 106, the ground truth image caption 108, and the perturbed image caption 110.

In one or more embodiments, the perturbed image caption associated with a training image is a modified version of a ground truth image caption for the training image. Modifications made to the text of the ground truth image caption to generate the perturbed image caption can include repetition, removal, masking, random order permutation, substitution in-sentence, and substitution out-of-sentence. For example, assume the ground truth image caption is: "A white house with brick walls and a car parked with trees and sky in the background." An example repetition perturbation is, "A white house with brick walls brick walls and a car parked with trees and sky in the background," where a word or phrase is repeated in the perturbed image caption. An example removal perturbation is, "A white house with and a car parked with trees and sky in the background," where a word or phrase is removed in the perturbed image caption. An example masking perturbation is, "A white house with [mask] and a car parked with trees and sky in the background," where a mask token replaces a word or phrase in the perturbed image caption. An example random order permutation perturbation is, "walls A car with brick and parked a and with house white trees in the background sky," where the ground truth image caption is randomly shuffled. An example substitution in-sentence perturbation is, "A brick walls with white house and a car parked with trees and sky in the background," where the positions of words or phrases within the ground truth image caption are swapped. An example substitution out-of-sentence perturbation is, "A white house with brick walls and a car parked with brown fireplace and sky in the background," where words or phrases are swapped with words or phrases from other sentence (e.g., "brown fireplace" swapped with "trees").

After the input analyzer 104 analyzes the training input 100 to identify the training image 106, the ground truth image caption 108, and the perturbed image caption 110, the training image 106 is sent to a visual encoder 112, as shown at numeral 3. In one or more other embodiments, the input analyzer 104 optionally stores the training input 100 in a memory or storage location for later access.

In one or more embodiments, the visual encoder 112 is configured to generate, or extract, a visual embedding 114 from the training image 106, at numeral 4. In one or more embodiments, the visual embedding 114 for training image 106 are feature vectors that are n-dimensional vectors of numerical features that represent the training image 106.

The ground truth image caption 108, and the perturbed image caption 110 are sent to the perturbation-aware text encoder 116, as shown at numeral 5. In one or more embodiments, the perturbation-aware text encoder 116 is configured to generate, or extract, a ground truth image caption text embedding 118 from the ground truth image caption 108 and a perturbed image caption text embedding 120 from the perturbed image caption 110, at numeral 6. In one or more embodiments, the perturbation-aware text encoder 116 is a sentence encoder configured and trained to compute embeddings for a given input (e.g., an image caption sentence). In one or more embodiments, the ground truth image caption text embedding 118 and the perturbed image caption text embedding 120 are feature vectors that are n-dimensional vectors of numerical features that represent the ground truth image caption 108 and the perturbed image caption 110, respectively.

In one or more embodiments, the visual embedding 114 extracted by the visual encoder 112 is can be sent to loss functions 122, at numeral 7. The ground truth image caption text embedding 118 and the perturbed image caption text embedding 120 are also sent to the loss functions 122, at numeral 8. Using the visual embedding 114, the ground truth image caption text embedding 118, and the perturbed image caption text embedding 120, the loss functions 122 can calculate a loss, at numeral 9.

In one or more embodiments, using an image (I), ground truth caption (o), and perturbed caption (p) triplet as the training input 100, the visual embedding 114 can be represented by V(I), the ground truth image caption text embedding 118 can be represented by T(o), and the perturbed image caption text embedding 120 can be represented by T(p). The loss functions 122 compute the cosine similarity between the embeddings. In one or more embodiments, a first loss, Loss$_1$, is the cosine embedding loss of the two representations to increase the similarity between the visual embedding 114 and the ground truth image caption text embedding 118. The purpose of the first loss is to teach the perturbation-aware text encoder 116 to produce a higher score for the ground truth image caption 108 by increasing the cosine similarity of the visual embedding 114 and the ground truth image caption text embedding 118. A second loss, Loss$_2$, is designed to reduce the cosine similarity of the visual embedding 114 and the perturbed image caption text embedding 120. A third loss, Loss$_3$, is designed to reduce the cosine similarity between the ground truth image caption text embedding 118 and the perturbed image caption text embedding 120. The three loss functions can be expressed as follows:

$$\text{Loss}_1 = 1 - \cos(V(I), T(o))$$

$$\text{Loss}_2 = \max(0, \cos(V(I), T(p)))$$

$$\text{Loss}_3 = \max(0, \cos(T(o), T(p)))$$

In one or more embodiments, combining the three losses, the final objective loss function can be expressed as follows:

$$\text{Loss} = \text{Loss}_1 + \lambda_1 * \text{Loss}_2 + \lambda_2 * \text{Loss}_3$$

The calculated loss, Loss, can then be backpropagated to train the perturbation-aware text encoder 116 to finetune the scoring of image captions, at numeral 10.

Figure 2:
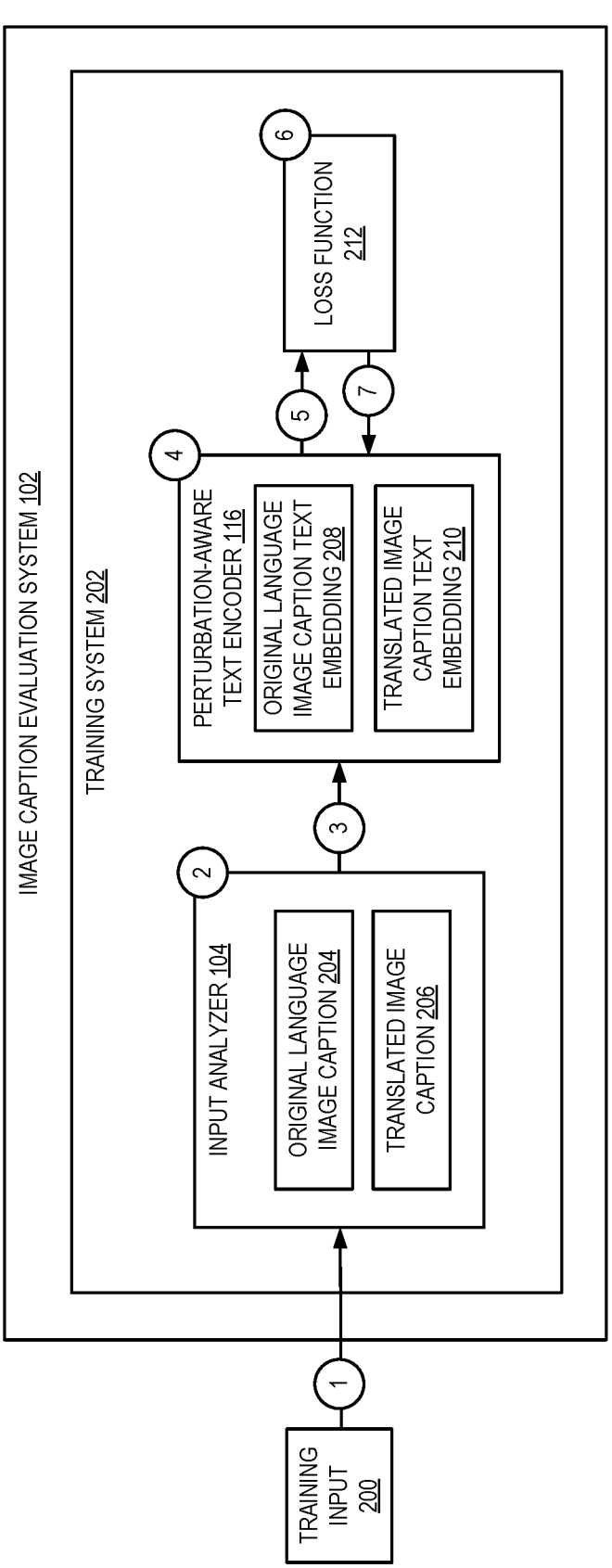
FIG. 2 illustrates a diagram of a process of training a perturbation-aware text encoder to recognize image captions in multiple languages in accordance with one or more embodiments.

FIG. 2 illustrates a diagram of a process of training a perturbation-aware text encoder to recognize image captions in multiple languages in accordance with one or more embodiments. In one or more embodiments, the training process depicted in FIG. 2 is a pre-training phase of the perturbation-aware text encoder 116 performed prior to a fine-tuning training process depicted in FIG. 1. In one or more embodiments, a training system 202 is configured to train a text encoder (e.g., perturbation-aware text encoder 116) through teacher learning to recognize image captions in multiple languages based on training inputs. In some embodiments, the training system 202 is a part of an image caption evaluation system 102. In other embodiments, the training system 202 can be a standalone system, or part of another system, and deployed to the image caption evaluation system 102. For example, the training system 202 may be implemented as a separate system implemented on electronic devices separate from the electronic devices implementing image caption evaluation system 102. As shown in FIG. 1, the training system 202 receives a training input 200, as shown at numeral 1. For example, the image caption evaluation system 102 receives the training input 200 from a user via a computing device or from a memory or storage location.

As illustrated in FIG. 1, the image caption evaluation system 102 includes an input analyzer 104 that receives the training input 200. In some embodiments, the input analyzer 104 analyzes the training input 200, as shown at numeral 2. In some embodiments, the input analyzer 104 analyzes the training input 200 to identify image captions in multiple languages. For example, the training input 200 includes an original language image caption 204 and a translated image caption 206. In some embodiments, the training input 200 can include only the original language image caption 204 and the image caption is translated into one or more of a plurality of supported language by the training system 202. For example, the input analyzer 104 can include a machine translation module to perform language translations. The training input 200 can include multiple original language image captions and translated image captions that can be fed to the training system 202 in parallel or in series.

After the input analyzer 104 analyzes the training input 200 to identify the original language image caption 204 and the translated image caption 206, the original language image caption 204 and the translated image caption 206 are sent to a perturbation-aware text encoder 116, as shown at numeral 3. In one or more other embodiments, the input analyzer 104 optionally stores the training input 200 in a memory or storage location for later access.

In one or more embodiments, the perturbation-aware text encoder 116 is configured to generate, or extract, an original language image caption text embedding 208 from the original language image caption 204 and a translated image caption text embedding 210 from the translated image caption 206, at numeral 4. In one or more embodiments, the original language image caption text embedding 208 and the translated image caption text embedding 210 are feature vectors that are n-dimensional vectors of numerical features that represent the original language image caption 204 and the translated image caption 206, respectively.

In one or more embodiments, the original language image caption text embedding 208 and the translated image caption text embedding 210 extracted by the perturbation-aware text encoder 116 from the original language image caption 204 and the translated image caption 26, respectively, are sent to loss function 212, at numeral 5. Using the original language image caption text embedding 208 and the translated image caption text embedding 210, the loss function 212 can calculate a loss, at numeral 6. In one or more embodiments, the loss function 212 calculates a mean square error (MSE) between the original language image caption text embedding 208 and the translated image caption text embedding 210. The calculated loss can then be backpropagated to train the perturbation-aware text encoder 116, at numeral 7. In one or more embodiments, the pre-training process described in FIG. 2 trains the perturbation-aware text encoder 116 to recognize similar image captions in multiple languages without requiring annotation of the training data.

Figure 3:
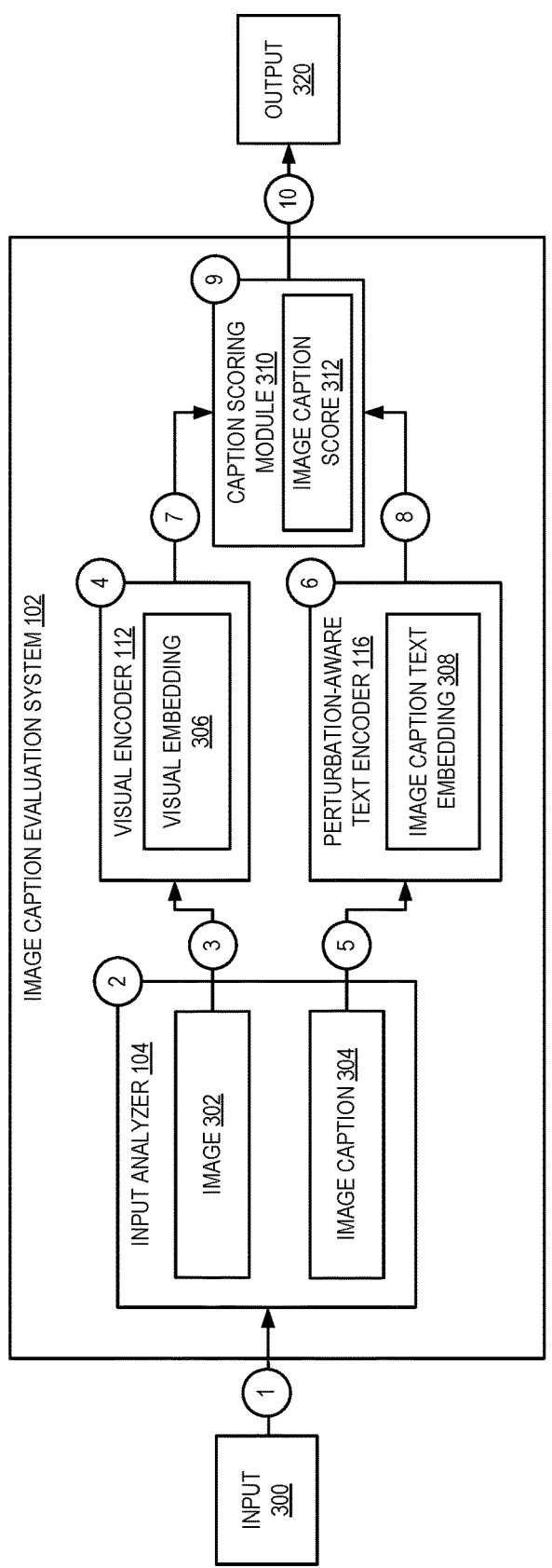
FIG. 3 illustrates a diagram of a process of using trained machine learning models to evaluate image captions for images in accordance with one or more embodiments.

FIG. 3 illustrates a diagram of a process of using trained machine learning models to evaluate image captions for images in accordance with one or more embodiments. In one or more embodiments, the image caption evaluation system 102 has been trained using the processes shown in FIGS. 1 and 2. As shown in FIG. 3, the image caption evaluation system 102 receives an input 300, as shown at numeral 1. For example, the image caption evaluation system 102 receives the input 300 from a user via a computing device or from a memory or storage location. In one or more embodiments, the input 300 includes at least an image (e.g., image 302) and an image caption (e.g., image caption 304). The input 300 can include multiple images and image captions that can be fed to the image caption evaluation system 102 in parallel or in series.

As illustrated in FIG. 3, the image caption evaluation system 102 includes an input analyzer 104 that receives the input 300. In some embodiments, the input analyzer 104 analyzes the input 300, as shown at numeral 2. In some embodiments, the input analyzer 104 analyzes the input 300 to identify the image 302 and the image caption 304.

After the input analyzer 104 analyzes the input 300 to identify the image 302 and the image caption 304, the image 302 is sent to a visual encoder 112, as shown at numeral 3. In one or more other embodiments, the input analyzer 104 optionally stores the input 300 in a memory or storage location for later access.

In one or more embodiments, the visual encoder 112 is configured to generate, or extract, a visual embedding 306 from the image 302, at numeral 4. In one or more embodiments, the visual embedding 306 for the image 302 are feature vectors that are n-dimensional vectors of numerical features that represent the image 302.

The image caption 304 is sent to the perturbation-aware text encoder 116, as shown at numeral 5. In one or more embodiments, the perturbation-aware text encoder 116 is configured to generate, or extract, an image caption text embedding 308 from image caption 304, at numeral 6. In one or more embodiments, the image caption text embedding 308 includes feature vectors that are n-dimensional vectors of numerical features that represent the image caption 304.

In one or more embodiments, the visual embedding 306 extracted by the visual encoder 112 is can be sent to a caption scoring module 310, at numeral 7. The image caption text embedding 308 extracted by the perturbation-aware text encoder 116 is sent to the caption scoring module 310, at numeral 8. Using the visual embedding 306 and the image caption text embedding 308, the caption scoring module 310 calculates an image caption score 312 for the image caption 304, at numeral 9. The image caption score 312 provides a metric for the accuracy of the image caption 304 for the image 302. In one embodiment, the caption scoring module 310 gives weight to the cosine similarity of embeddings created through the visual encoder 112 and the perturbation-aware text encoder 116. A scoring formula for an input pair of an image and caption (I, c) can be represented as follows:

$$\text{Score}(I, c) = w * \max(0, \cos(V(I), T(c))),$$

where V(I) is the visual embedding 306 extracted by the visual encoder 112 and T(c) is the image caption text embedding 308 extracted by the perturbation-aware text encoder 116. In one or more embodiments, the value of w is set to 2.5.

In one or more embodiments, the image caption evaluation system 102 provides an output 320, including the image caption score 312, as shown at numeral 10. In one or more embodiments, after the process described above in numerals 1-9, the output 320 is sent to the user or computing device that initiated the image caption evaluation process with the image caption evaluation system 102, to another computing device associated with the user or another user, or to another system or application. For example, after the process described above in numerals 1-10, the image caption score 312 can be displayed in a user interface of a computing device.

Figure 4:
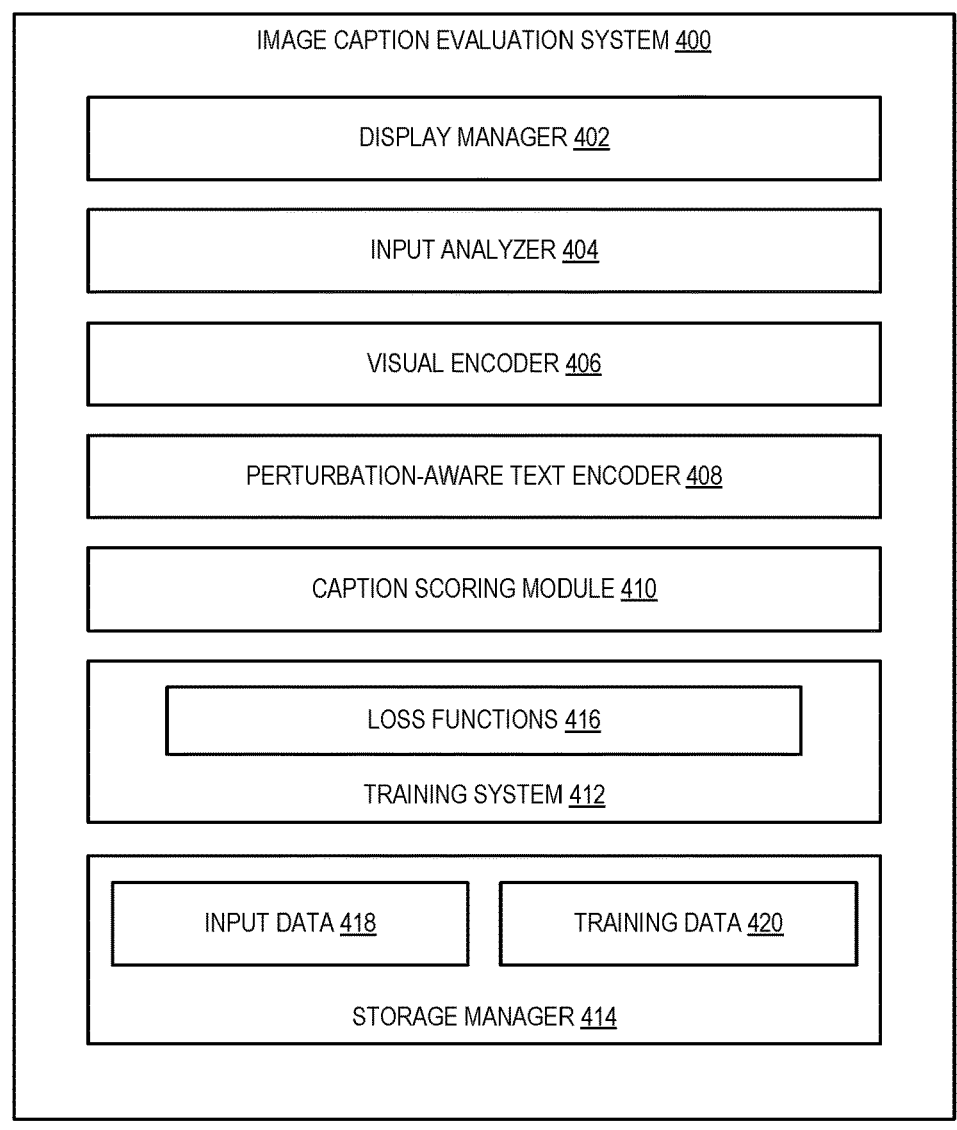
FIG. 4 illustrates a schematic diagram of an image caption evaluation system in accordance with one or more embodiments.

FIG. 4 illustrates a schematic diagram of an image caption evaluation system (e.g., "image caption evaluation system" described above) in accordance with one or more embodiments. As shown, the image caption evaluation system 400 may include, but is not limited to, a display manager 402, an input analyzer 404, a visual encoder 406, a perturbation-aware text encoder 408, a caption scoring module 410, a training system 412, and a storage manager 414. As shown, the training system 412 include loss functions 416. The storage manager 414 includes input data 418 and training data 420.

As illustrated in FIG. 4, the image caption evaluation system 400 includes a display manager 402. In one or more embodiments, the display manager 402 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 402 may identify, display, update, or otherwise provide various user interfaces that include one or more display elements in various layouts. In one or more embodiments, the display manager 402 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 4, the image caption evaluation system 400 also includes an input analyzer 404. The input analyzer 404 analyzes an input received by the image caption evaluation system 400 to identify images and image captions.

As further illustrated in FIG. 4, the image caption evaluation system 400 also includes a visual encoder 406 configured to extract visual embeddings (e.g., visual features or feature vectors) from an input image (e.g., images from image-caption pairs). In some embodiments, the visual embeddings are feature vectors that are n-dimensional vectors of numerical features that represent the input image.

As further illustrated in FIG. 4, the image caption evaluation system 400 also includes a perturbation-aware text encoder 408 configured to extract text embedding (e.g., text features or feature vectors) from an input image captions (e.g., ground truth image captions for image-caption pairs and perturbed versions of the ground truth image captions). In some embodiments, the visual embeddings are feature vectors that are n-dimensional vectors of numerical features that represent the input image captions. In some embodiments, the perturbation-aware text encoder 408 is trained in a first training process to handle image captions in a plurality of languages and then in a second training process to identify ground truth image captions from perturbed image captions. In other embodiments, the first training process can be omitted.

As further illustrated in FIG. 4, the image caption evaluation system 400 also includes a caption scoring module 410 configured to generate an evaluations score, or metric, for image captions corresponding to an image. In one or more embodiments, the caption scoring module 410 uses the embeddings generated by the visual encoder 406 and the perturbation-aware text encoder 408 generate a score indicating how accurately the image caption represents the content of the image.

As further illustrated in FIG. 4, the image caption evaluation system 400 includes training system 412 which is configured to teach, guide, tune, and/or train one or more neural networks. In particular, the training system 412 trains perturbation-aware text encoder 408 based on training data.

As further illustrated in FIG. 4, the storage manager 414 includes input data 418 and training data 420. In particular, the input data 418 may include an input image and image caption received by the image caption evaluation system 400. In one or more embodiments, the training data 420 may include training datasets including training triplets, that can include training images, ground truth image captions, and perturbed image captions, that can be used during a training process of the image caption evaluation system 400 to train one or more neural networks.

Each of the components 402-414 of the image caption evaluation system 400 and their corresponding elements (as shown in FIG. 4) may be in communication with one another using any suitable communication technologies. It will be recognized that although components 402-414 and their corresponding elements are shown to be separate in FIG. 4, any of components 402-414 and their corresponding elements may be combined into fewer components, such as into a single facility or module, divided into more components, or configured into different components as may serve a particular embodiment.

The components 402-414 and their corresponding elements can comprise software, hardware, or both. For example, the components 402-414 and their corresponding elements can comprise one or more instructions stored on a computer-readable storage medium and executable by processors of one or more computing devices. When executed by the one or more processors, the computer-executable instructions of the image caption evaluation system 400 can cause a client device and/or a server device to perform the methods described herein. Alternatively, the components 402-414 and their corresponding elements can comprise hardware, such as a special purpose processing device to perform a certain function or group of functions. Additionally, the components 402-414 and their corresponding elements can comprise a combination of computer-executable instructions and hardware.

Furthermore, the components 402-414 of the image caption evaluation system 400 may, for example, be implemented as one or more stand-alone applications, as one or more modules of an application, as one or more plug-ins, as one or more library functions or functions that may be called by other applications, and/or as a cloud-computing model. Thus, the components 402-414 of the image caption evaluation system 400 may be implemented as a stand-alone application, such as a desktop or mobile application. Furthermore, the components 402-414 of the image caption evaluation system 400 may be implemented as one or more web-based applications hosted on a remote server. Alternatively, or additionally, the components of the image caption evaluation system 400 may be implemented in a suit of mobile device applications or "apps."

FIGS. 1-4, the corresponding text, and the examples, provide a number of different systems and devices that train a text encoder of an image caption evaluation system to recognize perturbations in image captions for images to produce more accurate image caption scores for image captions, and to score image captions in multiple languages. In addition to the foregoing, embodiments can also be described in terms of flowcharts comprising acts and steps in a method for accomplishing a particular result. For example, FIGS. 5 and 6 illustrate flowcharts of exemplary methods in accordance with one or more embodiments. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of a series of acts in a method of training an image caption evaluation system to recognize perturbed image captions from ground truth image captions in accordance with one or more embodiments. In one or more embodiments, the method 500 is performed in a digital medium environment that includes the image caption evaluation system 400. The method 500 is intended to be illustrative of one or more methods in accordance with the present disclosure and is not intended to limit potential embodiments. Alternative embodiments can include additional, fewer, or different steps than those articulated in FIG. 5.

As shown in FIG. 5, the method 500 includes an act 502 of receiving a training image, a ground truth image caption for the training image, and a perturbed image caption for the training image, wherein the perturbed image caption includes modifications to the ground truth image caption. In one or more embodiments, one or more triplets containing an image, a ground truth image caption for the image, and a perturbed image caption for the image are used to train the image caption evaluation system 102 to learn to recognize the difference between a ground truth image caption for the image and a perturbed version of the ground truth image caption to produce a more accurate and reliable evaluation system for scoring image captions. In one or more embodiments, the image caption evaluation system receives the training image, the ground truth image caption for the training image, and the perturbed image caption for the training image from a user (e.g., via a computing device) in a training input. In one or more embodiments, the user may select the training input in an application, or the user may submit the training input to a web service or an application configured to receive inputs.

In one or more embodiments, the training image is part of a training dataset. In such embodiments, each image in the training dataset is associated with a ground truth image caption, a description of an image background (e.g., black background, crowded room, white wall, sea and sky, etc.), a description of objects in the image (e.g., people, necklace, fence, chairs, hands, etc.), and a description of a relationship between the objects in the image (e.g., smiling, waiting, surrounding, etc.). In one or more embodiments, the perturbed image caption is generated by replacing first text elements in the ground truth image caption with second text elements from a different image caption. In other embodiments, the perturbed image caption is generated by removing or masking text elements from the ground truth image caption, randomly scrambling the ground truth image caption, swapping the location of text elements within the ground truth image caption, etc. In some embodiments, the image caption evaluation system receives the perturbed image caption in a training input. In other embodiments, the image caption evaluation system can generate the perturbed image caption after receiving a training input that includes an image and the ground truth image caption.

As shown in FIG. 5, the method 500 also includes an act 504 of generating, by a visual encoder, a visual embedding representation of the training image. In one or more embodiments, the visual embedding for the training image comprises feature vectors that are n-dimensional vectors of numerical features that represent the training image.

As shown in FIG. 5, the method 500 also includes an act 506 of generating, by a perturbation-aware text encoder, a first text embedding for the ground truth image caption and a second text embedding for the perturbed image caption. In one or more embodiments, the first text embedding and the second text embedding are feature vectors that are n-dimensional vectors of numerical features that represent the ground truth image caption and the perturbed image caption, respectively.

As shown in FIG. 5, the method 500 also includes an act 508 of computing losses between the visual embedding representation of the training image, the first text embedding for the ground truth image caption, and the second text embedding for the perturbed image caption. In one or more embodiments, a first loss is calculated between the visual embedding representation of the training image and the first text embedding for the ground truth image caption. In one or more embodiments, a second loss is calculated between the visual embedding representation of the training image and the second text embedding for the perturbed image caption. In one or more embodiments, a third loss is calculated between the first text embedding for the ground truth image caption and the second text embedding for the perturbed image caption. The calculated losses can then be aggregated to generate an overall loss.

As shown in FIG. 5, the method 500 also includes an act 510 of training the perturbation-aware text encoder based on the computed losses. In one or more embodiments, the overall loss computed in act 508 is backpropagated to the perturbation-aware text encoder to train the perturbation-aware text encoder to learn to recognize perturbed image captions from ground truth image captions.

In one or more embodiments, an initial training phase is performed to train the perturbation-aware text encoder to enable the image caption evaluation system to evaluate image captions in multiple language. In the initial training phase, each ground truth image caption of the set of ground truth image captions is translated from a first language to a second language (e.g., using a machine translation). A text encoder generates a first text embedding representation of the ground truth image caption in the first language, and the perturbation-aware text encoder generates a second text embedding representation of the ground truth image caption in the second language. A loss is then computed between the first text embedding representation and the second text embedding representation. In one embodiment, a mean square error loss is computed. The computed loss is then backpropagating to train the perturbation-aware text encoder.

FIG. 6 illustrates a flowchart of a series of acts in a method of evaluating image captions generated for images using an image caption evaluation system trained to recognize perturbed image captions from ground truth image captions in accordance with one or more embodiments. In one or more embodiments, the method 600 is performed in a digital medium environment that includes the image caption evaluation system 400. The method 600 is intended to be illustrative of one or more methods in accordance with the present disclosure and is not intended to limit potential embodiments. Alternative embodiments can include additional, fewer, or different steps than those articulated in FIG. 6.

As shown in FIG. 6, the method 600 includes an act 602 of receiving an image and an image caption, the image caption describing content in the image. In one or more embodiments, the image caption evaluation system receives the image from a user (e.g., via a computing device) in an input. In one or more embodiments, the user may select the input in an application, or the user may submit the input to a web service or an application configured to receive inputs.

As shown in FIG. 6, the method 600 also includes an act 604 of generating, by a visual encoder, a visual embedding representation of the image. In one or more embodiments, the visual embedding for the image are feature vectors that are n-dimensional vectors of numerical features that represent the image.

As shown in FIG. 6, the method 600 also includes an act 606 of generating, by a perturbation-aware text encoder, a text embedding for the image caption, wherein the perturbation-aware text encoder is trained to recognized perturbations in image captions. In one or more embodiments, the text embedding comprises feature vectors that are n-dimensional vectors of numerical features that represent the image caption. In one or more embodiments, the perturbation-aware text encoder is trained through the process described with respect to FIGS. 1 and 2.

As shown in FIG. 6, the method 600 also includes an act 608 of computing an image caption score for the image caption using the visual embedding representation of the image and text embedding for the image caption. In one or more embodiments, using the visual embedding and the text embedding, a caption scoring module calculates an image caption score for the image caption. The image caption score provides a metric for the accuracy of the image caption for the image. In one embodiment, the caption scoring module gives weight to the cosine similarity of embeddings created through the visual encoder and the perturbation-aware text encoder. A scoring formula for an input pair of an image and caption (I, c) can be represented as follows:

$$\text{Score}(I, c) = w * \max(0, \cos(V(I), T(c))),$$

where V(I) is the visual embedding and T(c) is the text embedding. In one or more embodiments, the value of w is set to 2.5.

Figure 7:
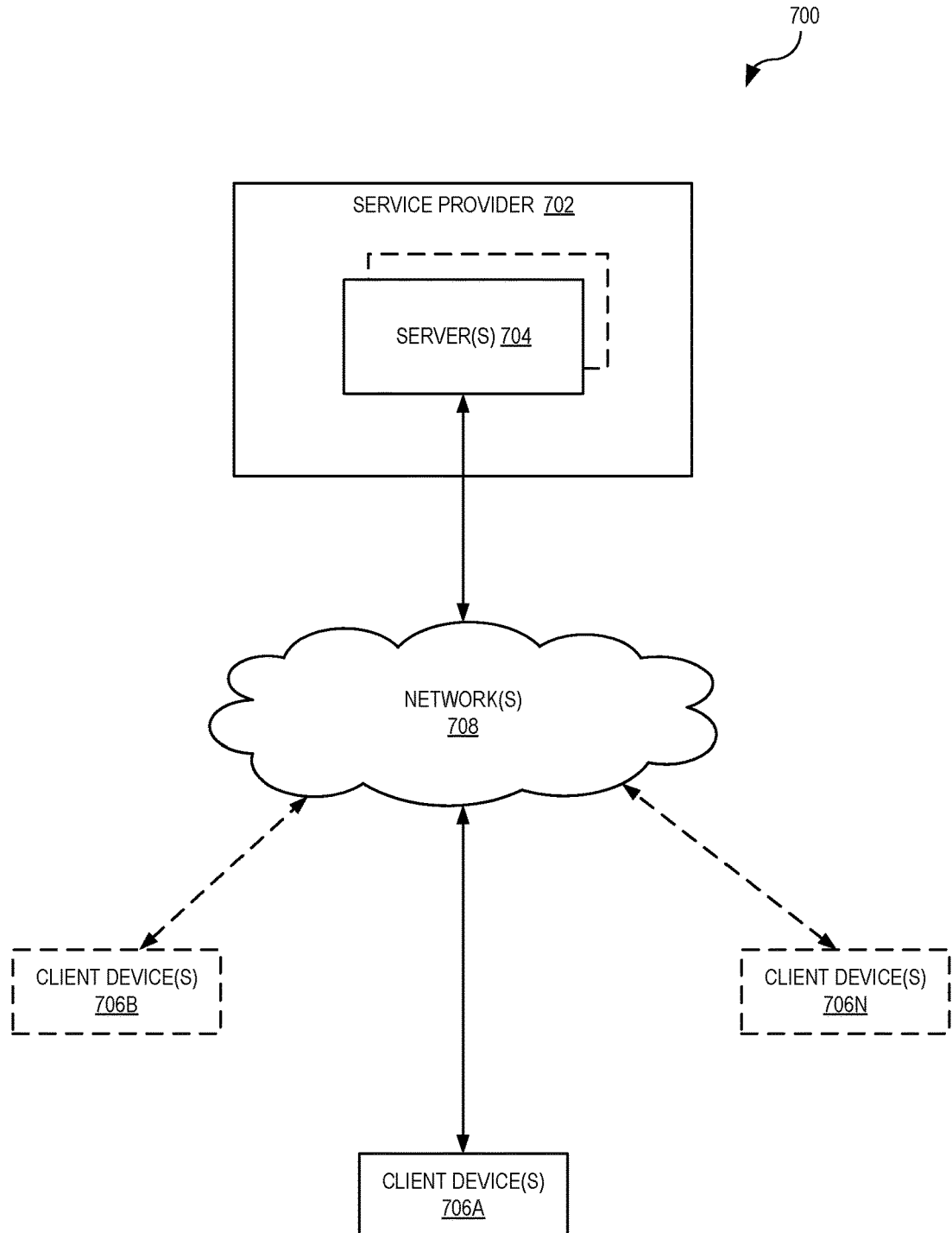
FIG. 7 illustrates a schematic diagram of an exemplary environment in which the image caption evaluation system can operate in accordance with one or more embodiments.

FIG. 7 illustrates a schematic diagram of an exemplary environment 700 in which the image caption evaluation system 400 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the image caption evaluation system 400. In particular, the image caption evaluation system 400 may be implemented in whole or in part on the client device 706A. Alternatively, in some embodiments, the environment 700 is implemented in a distributed architecture across multiple computing devices.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access the service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including input data 418, training data 420 or other information. For example, a server 704 may receive data from a client device, such as the client device 706A, and send the data to another client device, such as the client device 706B and/or 706N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the image caption evaluation system 400. In particular, the image caption evaluation system 400 can comprise an application running on the one or more servers 704 or a portion of the image caption evaluation system 400 can be downloaded from the one or more servers 704. For example, the image caption evaluation system 400 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or website hosted at the one or more servers 704.

Upon the client device 706A accessing a webpage or other web application hosted at the one or more servers 704, in one or more embodiments, the one or more servers 704 can provide a user of the client device 706A with an interface to provide inputs, including an image, a ground truth image caption and a perturbed image caption during training, and an image and an image caption during inference Upon receiving the input, the one or more servers 704 can automatically perform the methods and processes described above to train an image caption evaluation system produce an evaluation score for image captions indicating their accuracy at describing a corresponding image.

As just described, the image caption evaluation system 400 may be implemented in whole, or in part, by the individual elements 702-708 of the environment 700. It will be appreciated that although certain components of the image caption evaluation system 400 are described in the previous examples with regard to particular elements of the environment 700, various alternative implementations are possible. For instance, in one or more embodiments, the image caption evaluation system 400 is implemented on any of the client devices 706A-706N. Similarly, in one or more embodiments, the image caption evaluation system 400 may be implemented on the one or more servers 704. Moreover, different components and functions of the image caption evaluation system 400 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory computer-readable storage media which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
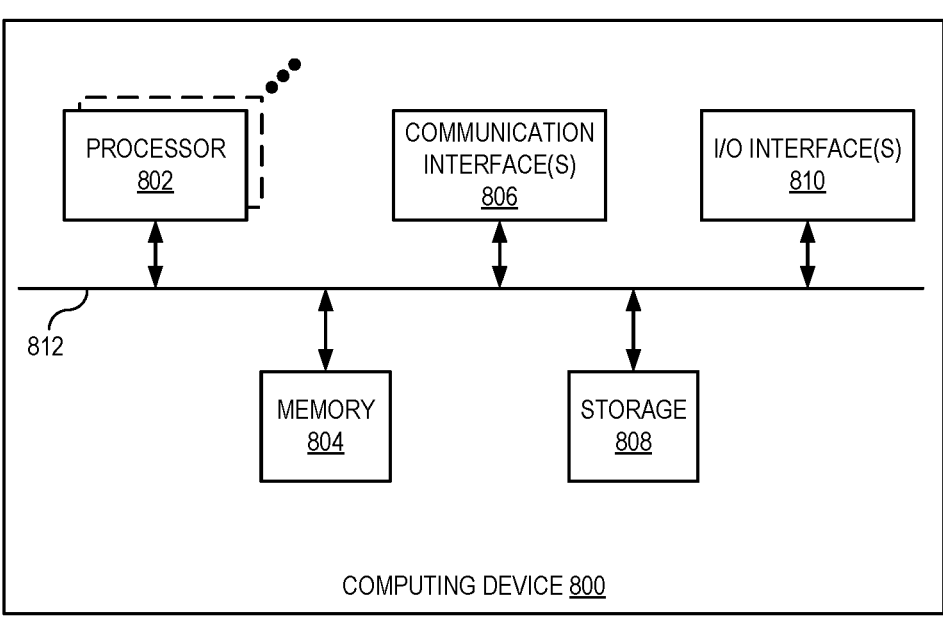
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the image caption evaluation system 400. As shown by FIG. 8, the computing device can comprise a processor 802, memory 804, one or more communication interfaces 806, a storage device 808, and one or more input or output ("I/O") devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more I/O devices/ interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
receiving a training image and a ground truth image caption for the training image;
generating a perturbed image caption for the training image by performing modifications to text elements of the ground truth image caption;
generating, by a visual encoder, a visual embedding representation of the training image;
generating, by a perturbation-aware text encoder, a first text embedding for the ground truth image caption and a second text embedding for the perturbed image caption;
computing losses between the visual embedding representation of the training image, the first text embedding for the ground truth image caption, and the second text embedding for the perturbed image caption; and
training the perturbation-aware text encoder based on the computed losses.

2. The computer-implemented method of claim 1, further comprising:
performing an initial training phase of the perturbation-aware text encoder using a set of ground truth image captions in a first language and the set of ground truth image captions translated into a second language.

3. The computer-implemented method of claim 2, wherein performing the initial training phase of the perturbation-aware text encoder further comprises:
for each ground truth image caption of the set of ground truth image captions:
translating the ground truth image caption from the first language to the second language;
generating, by a text encoder, a first text embedding representation of the ground truth image caption in the first language;
generating, by the perturbation-aware text encoder, a second text embedding representation of the ground truth image caption in the second language;
computing a loss between the first text embedding representation and the second text embedding representation; and
backpropagating the loss to train the perturbation-aware text encoder.

4. The computer-implemented method of claim 1, further comprising:
generating the perturbed image caption by replacing first text elements in the ground truth image caption with second text elements from a different image caption.

5. The computer-implemented method of claim 1, further comprising:
generating the perturbed image caption by swapping text elements within the ground truth image caption.

6. The computer-implemented method of claim 1, further comprising:
generating the perturbed image caption by removing text elements within the ground truth image caption.

7. The computer-implemented method of claim 1, wherein computing the losses between the visual embedding representation of the training image, the first text embedding for the ground truth image caption, and the second text embedding for the perturbed image caption further comprises:

computing a first loss between the visual embedding representation of the training image and the first text embedding for the ground truth image caption;

computing a second loss between the visual embedding representation of the training image and the second text embedding for the perturbed image caption;

computing a third loss between the first text embedding for the ground truth image caption and the second text embedding for the perturbed image caption; and aggregating the first loss, the second loss, and the third loss to generate an overall loss.

8. The computer-implemented method of claim 1, wherein the training image is part of a training dataset, and wherein each image in the training dataset is associated with a ground truth image caption for the image, a description of an image background, a description of objects in the image, and a description of a relationship between the objects in the image.

9. A non-transitory computer-readable storage medium storing executable instructions, which when executed by a processing device, cause the processing device to perform operations comprising:

receiving a training image and a ground truth image caption for the training image;

generating a perturbed image caption for the training image by performing modifications to text elements of the ground truth image caption;

generating, by a visual encoder, a visual embedding representation of the training image;

generating, by a perturbation-aware text encoder, a first text embedding for the ground truth image caption and a second text embedding for the perturbed image caption;

computing losses between the visual embedding representation of the training image, the first text embedding for the ground truth image caption, and the second text embedding for the perturbed image caption; and training the perturbation-aware text encoder based on the computed losses.

10. The non-transitory computer-readable storage medium of claim 9, wherein the instructions further cause the processing device to perform operations comprising:

performing an initial training phase of the perturbation-aware text encoder using a set of ground truth image captions in a first language and the set of ground truth image captions translated into a second language.

11. The non-transitory computer-readable storage medium of claim 10, wherein to perform the initial training phase of the perturbation-aware text encoder the instructions further cause the processing device to perform operations comprising:

for each ground truth image caption of the set of ground truth image captions:

translating the ground truth image caption from the first language to the second language;

generating, by a text encoder, a first text embedding representation of the ground truth image caption in the first language;

generating, by the perturbation-aware text encoder, a second text embedding representation of the ground truth image caption in the second language;

computing a loss between the first text embedding representation and the second text embedding representation; and backpropagating the loss to train the perturbation-aware text encoder.

12. The non-transitory computer-readable storage medium of claim 9, wherein the instructions further cause the processing device to perform operations comprising:

generating the perturbed image caption by replacing first text elements in the ground truth image caption with second text elements from a different image caption.

13. The non-transitory computer-readable storage medium of claim 9, wherein the instructions further cause the processing device to perform operations comprising:

generating the perturbed image caption by swapping text elements within the ground truth image caption.

14. The non-transitory computer-readable storage medium of claim 9, wherein the instructions further cause the processing device to perform operations comprising:

generating the perturbed image caption by removing text elements within the ground truth image caption.

15. The non-transitory computer-readable storage medium of claim 9, wherein to computer the losses between the visual embedding representation of the training image, the first text embedding for the ground truth image caption, and the second text embedding for the perturbed image caption the instructions further cause the processing device to perform operations comprising:

computing a first loss between the visual embedding representation of the training image and the first text embedding for the ground truth image caption;

computing a second loss between the visual embedding representation of the training image and the second text embedding for the perturbed image caption;

computing a third loss between the first text embedding for the ground truth image caption and the second text embedding for the perturbed image caption; and aggregating the first loss, the second loss, and the third loss to generate an overall loss.

16. The non-transitory computer-readable storage medium of claim 9, wherein the training image is part of a training dataset, and wherein each image in the training dataset is associated with a ground truth image caption for the image, a description of an image background, a description of objects in the image, and a description of a relationship between the objects in the image.

17. A computer-implemented method, comprising:

receiving an image and an image caption, the image caption describing content in the image;

generating, by a visual encoder, a visual embedding representation of the image;

generating, by a perturbation-aware text encoder, a text embedding for the image caption, wherein the perturbation-aware text encoder is trained to recognize perturbations in image captions; and computing an image caption score for the image caption using the visual embedding representation of the image and text embedding for the image caption, wherein the image caption score is a metric indicating an accuracy of the image caption to the content in the image.

18. The computer-implemented method of claim 17, wherein the perturbation-aware text encoder is trained by:

receiving a training image and a ground truth image caption for the training image;

generating a perturbed image caption for the training image by performing modifications to text elements of the ground truth image caption;

generating, by the visual encoder, a visual embedding representation of the training image;

generating, by the perturbation-aware text encoder, a first text embedding for the ground truth image caption and a second text embedding for the perturbed image caption;

computing losses between the visual embedding representation of the training image, the first text embedding for the ground truth image caption, and the second text embedding for the perturbed image caption; and training the perturbation-aware text encoder to recognize the perturbations in the perturbed image caption using the computed losses.

19. The computer-implemented method of claim 17, wherein computing an image caption score using the visual embedding representation of the image and text embedding for the image caption comprises:

computing a cosine similarity of the visual embedding representation of the image and the text embedding for the image caption; and applying a weighting to the computed cosine similarity to compute the image caption score for the image caption.

20. The computer-implemented method of claim 17, wherein the perturbation-aware text encoder is trained by:

performing an initial training phase of the perturbation-aware text encoder using a set of ground truth image captions in a first language and the set of ground truth image captions translated into a second language.

\* \* \* \* \*